(12) United States Patent
Liu et al.

(10) Patent No.: US 7,868,593 B2
(45) Date of Patent: Jan. 11, 2011

(54) CHARGING CIRCUIT OF PORTABLE DEVICE

(75) Inventors: Chang-Chun Liu, Shenzhen (CN);
Xiao-Lin Gan, Shenzhen (CN);
Yu-Kuang Ho, Taipei Hsien (TW)

(73) Assignees: Hong Fu Jin Precision Industry (ShenZhen) Co., Ltd., Shenzhen, Guangdong Province (CN); Hon Hai Precision Industry co., Ltd., Tu-Cheng, Taipei Hsien (TW)

( * ) Notice: Subject to any disclaimer, the term of this patent is extended or adjusted under 35 U.S.C. 154(b) by 598 days.

(21) Appl. No.: 12/022,156

(22) Filed: Jan. 30, 2008

(65) Prior Publication Data
US 2009/0160398 A1    Jun. 25, 2009

(30) Foreign Application Priority Data
Dec. 20, 2007    (CN) ......................... 2007 1 0203289

(51) Int. Cl.
*H01M 10/46* (2006.01)
(52) U.S. Cl. ...................................... 320/137
(58) Field of Classification Search ................ 320/107, 320/114, 124, 128, 134, 137, 140, 145
See application file for complete search history.

(56) References Cited

U.S. PATENT DOCUMENTS

| | | | | |
|---|---|---|---|---|
| 4,484,256 A | * | 11/1984 | Hartman | 363/26 |
| 6,144,187 A | * | 11/2000 | Bryson | 320/137 |
| 6,597,221 B2 | * | 7/2003 | Hall et al. | 327/175 |
| 2002/0128690 A1 | * | 9/2002 | Zarinetchi et al. | 607/33 |

* cited by examiner

*Primary Examiner*—Edward Tso
(74) *Attorney, Agent, or Firm*—Frank R. Niranjan

(57) ABSTRACT

A charging circuit of a portable device includes a switch circuit having an input connected to a storage battery of the portable device for triggering the storage battery to supply power to an electronic device, a reference voltage circuit, a regulating circuit, a filter circuit filtering voltage signals from the storage battery, a collecting circuit, a comparator circuit, a rectangular generator, an integral circuit, and a driving circuit. The reference voltage circuit and the collecting circuit respectively output a reference voltage signal and a collecting voltage signal to the comparator circuit. The rectangular wave generator outputs a rectangular wave to the integral circuit. The integral circuit outputs a triangle wave signal to the driving circuit. The driving circuit outputs a pulse width modulation (PWM) signal to drive the regulating circuit to charge the electronic device.

17 Claims, 2 Drawing Sheets

CHARGING CIRCUIT OF PORTABLE DEVICE

BACKGROUND

1. Field of the Invention

The present invention relates to charging circuits, and particularly to a charging circuit which is used in a portable device and configured to charge electronic devices.

2. Description of Related Art

Nowadays, some portable devices such as notebook computers are capable of recharging other electronic devices such as mobile phones and MP3 players. However, these portable devices can only recharge other electronic devices when they are turned on. If they are turned off, they have no charging function available.

What is desired, therefore, is to provide a charging circuit of a portable device which can recharge electronic devices even when the portable device is turned off.

SUMMARY

An embodiment of a charging circuit of a portable device includes a switch circuit having an input connected to a storage battery of the portable device for triggering the storage battery to supply power to an electronic device, a reference voltage circuit, a regulating circuit, a filter circuit filtering voltage signals from the storage battery, a collecting circuit, a comparator circuit, a rectangular wave generator, an integral circuit, and a driving circuit. The reference voltage circuit and the collecting circuit respectively output a reference voltage signal and a collecting voltage signal to the comparator circuit. The rectangular wave generator outputs a rectangular wave to the integral circuit. The integral circuit outputs a triangle wave signal to the driving circuit. The driving circuit outputs a pulse width modulation (PWM) signal to drive the regulating circuit to charge the electronic device.

Other advantages and novel features of the present invention will become more apparent from the following detailed description of an embodiment when taken in conjunction with the accompanying drawings, in which:

DETAILED DESCRIPTION

Figure 1:
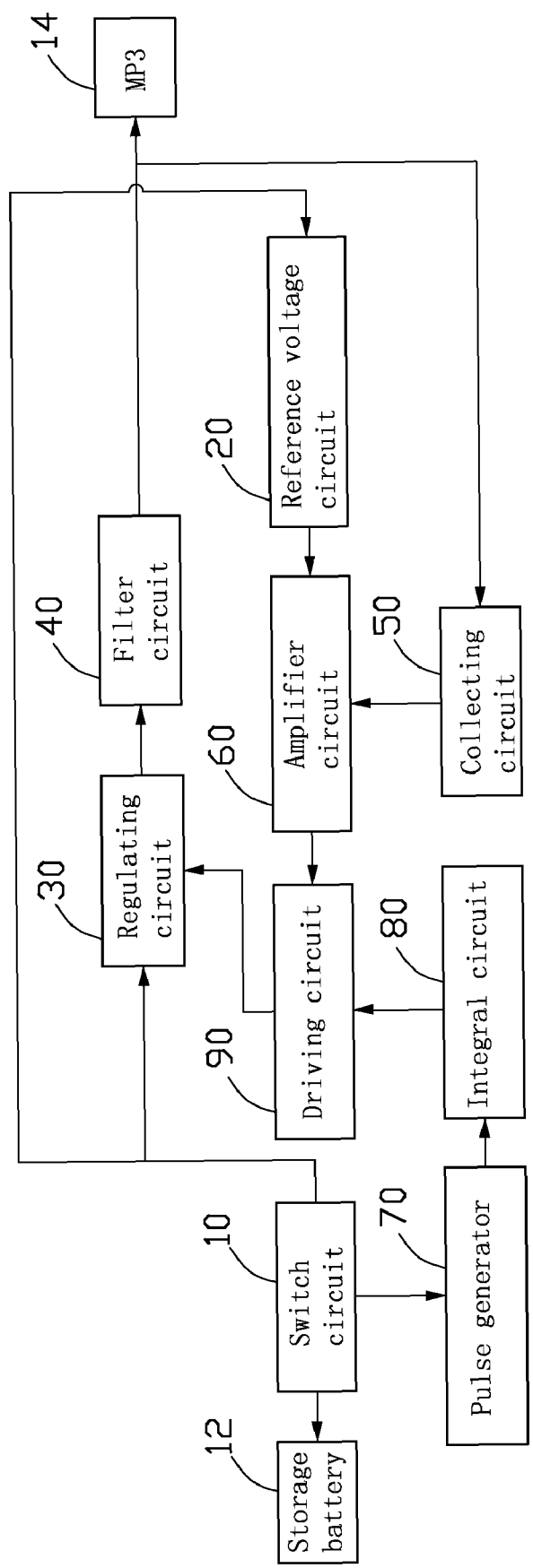
FIG. 1 is a block diagram of a charging circuit of a portable device in accordance with an embodiment of the present invention.
Figure 2:
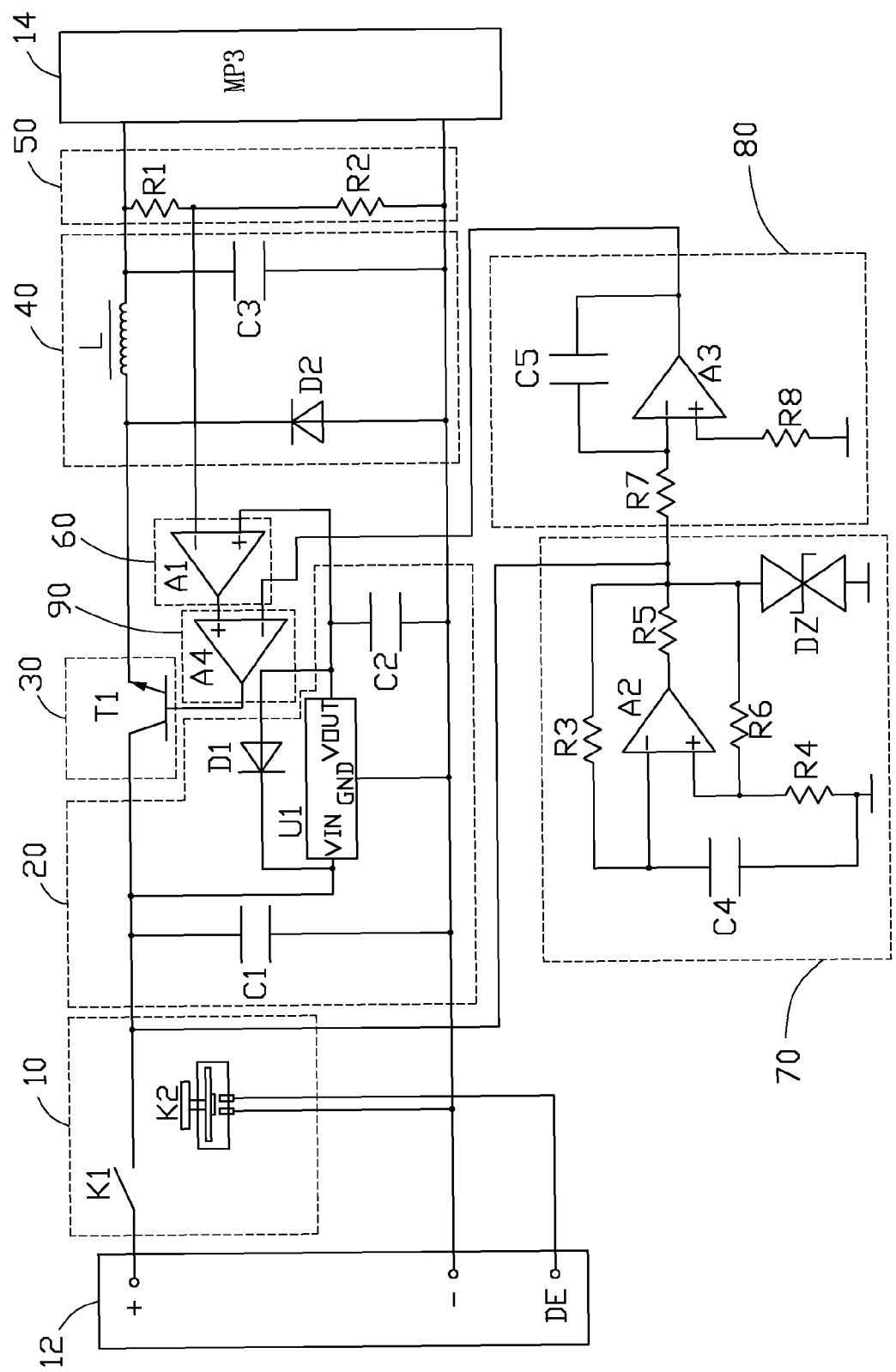
FIG. 2 is a circuit diagram of FIG. 1.

Referring to FIGS. 1 and 2, a charging circuit of a portable device in accordance with an embodiment of the present invention is provided to charge an electronic device such as an MP3 player 14 via a storage battery of a portable device such as a portable computer. The charging circuit includes a switch circuit 10, a reference voltage circuit 20, a regulating circuit 30, a filter circuit 40, a collecting circuit 50, a comparator circuit 60, a rectangular wave generator 70, an integral circuit 80, and a driving circuit 90.

The switch circuit 10 includes a control switch K1 and a trigger switch K2. The reference voltage circuit 20 includes a three-terminal positive voltage regulator U1, a diode D1, and two capacitors C1 and C2. The regulating circuit 30 includes a transistor T1. The filter circuit 40 includes a capacitor C3, an inductor L, and a diode D2. The collecting circuit 50 includes two resistors R1 and R2. The comparator circuit 60 includes a comparator A1. The pulse generator 70 includes a comparator A2, a capacitor C4, four resistors R3, R4, R5, R6, and a voltage regulator diode DZ. The integral circuit 80 includes a comparator A3, two resistors R7 and R8, and an integral capacitor C5. The driving circuit 90 includes a comparator A4.

A terminal of the control switch K1 is connected to the positive terminal of the storage battery 12. The negative terminal of the storage battery 12 is connected to a terminal of the trigger switch K2. The other terminal of the trigger switch K2 is connected to a detecting terminal DE of the storage battery 12. The other terminal of the control switch K1 is connected to the collector of the transistor T1. The emitter of the transistor T1 is connected to a terminal of the inductor L. The other terminal of the inductor L is configured to connect to a charging terminal of the MP3 player 14. The negative terminal of the storage battery 12 is configured to connect to the other charging terminal of the MP3 Player 14.

The capacitor C1 is connected between the collector of the transistor T1 and the negative terminal of the storage battery 12. An input terminal of the voltage regulator U1 is connected to the collector of the transistor T1. A ground terminal of the voltage regulator U1 is connected to the negative terminal of the storage battery 12. An output terminal of the voltage regulator U1 is connected to a non-inverting terminal of the comparator A1. The cathode of the diode D1 is connected to the input terminal of the voltage regulator U1. The anode of the diode D1 is connected to the output terminal of the voltage regulator U1. The capacitor C2 is connected between the output terminal of the voltage regulator U1 and the cathode of the storage batter 12. An output terminal of the comparator A4 is connected to the base of the transistor T1. An output terminal of the comparator A1 is connected to a non-inverting terminal of the comparator A4. The cathode of the diode D2 is connected to the emitter of the transistor T1. The anode of the diode D2 is connected to the negative terminal of the storage battery 12. The capacitor C3 is connected between the two charging terminals of the MP3 Player 14. The resistor R1 is connected with the resistor R2 in series between the two charging terminals of the MP3 Player 14. An inverting terminal of the comparator A1 is connected to a node between the two resistors R1 and R2.

An inverting terminal of the comparator A4 is connected to an output terminal of the comparator A3. An non-inverting terminal of the comparator A3 is grounded via the resistor R8. An inverting terminal of the comparator A3 is connected to an output terminal of the comparator A2 via the resistors R7 and R5 in turn. The capacitor C5 is connected between the inverting terminal and the output terminal of the comparator A3. The collector of the transistor T1 is connected to a node between the resistors R7 and R5. An inverting terminal of the comparator A2 is connected to the node between the resistors R7 and R5 via the resistor R3 and grounded via the capacitor C4. A non-inverting terminal of the comparator A2 is grounded via the resistor R4 and connected to the node between the resistors R7 and R5 via the resistor R6. The voltage regulator diode DZ is connected between the ground and the node between the resistors R7 and R5.

In use, the MP3 Player 14 is connected to the charging circuit of the portable device via a charging connector (not shown) thereon when it is desired to charge/recharge the player 14. Initially, the control switch K1 and the trigger switch K2 are opened. When the control switch K1 and the trigger switch K2 are closed, the switch circuit 10 triggers the storage battery 12 to charge the MP3 Player 14. The storage battery 12 outputs voltage signals to supply power to the reference voltage circuit 20, the regulating circuit 30, and the pulse generator 70 via the switch circuit 10. The reference voltage circuit 20 outputs a 5V reference voltage signal to the comparator A1. The collecting circuit 50 outputs a collecting voltage signal to the comparator A1.

The filter circuit 40 filters the voltage signals from the storage battery 12. The pulse generator 70 receives the voltage signals from the storage battery 12 and outputs rectangular wave signals to the integral circuit 80. The integral circuit 80 receives the rectangular wave signals and transforms them to triangle wave signals to the inverting terminal of the comparator A4. The output signal of the comparator A1 is output to the non-inverting terminal of the comparator A4. The output terminal of the comparator A4 outputs a pulse width modulation (PWM) signal to turn on the transistor T1. Thus the MP3 player 14 is charged.

The charging circuit of the portable device can charge electronic devices even when the portable device is turned off, which is very convenient.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A charging circuit of a portable device, comprising:
    a switch circuit having an input connected to a storage battery of the portable device for triggering the storage battery to supply power to an electronic device;
    a reference voltage circuit;
    a regulating circuit;
    a filter circuit filtering voltage signals from the storage battery;
    a collecting circuit;
    a comparator circuit;
    a rectangular wave generator;
    an integral circuit; and
    a driving circuit, an output of the switch circuit connected to outputs of the comparator circuit, the filter circuit, and the integral circuit respectively via the reference voltage circuit, the regulating circuit, and the rectangular wave generator, an output of the filter circuit configured for connecting to the electronic device and connected to an input of the comparator circuit via the collecting circuit, outputs of the comparator circuit and the integral circuit connected to inputs of the driving circuit, an output of the driving circuit connected to the regulating circuit, the reference voltage circuit and the collecting circuit respectively outputting a reference voltage signal and a collecting voltage signal to the comparator circuit, The rectangular wave generator outputting a rectangular wave to the integral circuit, the integral circuit outputting a triangle wave signal to the driving circuit, the driving circuit outputting a pulse width modulation (PWM) signal to drive the regulating circuit to charge the electronic device.

2. The charging circuit as claimed in claim 1, wherein the switch circuit comprises a control switch and a trigger switch, a terminal of the control switch is connected to the positive terminal of the storage battery of the portable device, the negative terminal of the storage battery is connected to a terminal of the trigger switch, the other terminal of the trigger switch is connected to a detecting terminal of the storage battery, the other terminal of the control switch is connected to the reference voltage circuit.

3. The charging circuit as claimed in claim 2, wherein the reference voltage circuit includes comprises a three-terminal positive voltage regulator, a first diode, a first capacitor and a second capacitor, the first capacitor is connected between the other terminal of the control switch and the negative terminal of the storage battery, an input terminal of the voltage regulator is connected to the other terminal of the control switch, a ground terminal of the voltage regulator is connected to the negative terminal of the storage battery, an output terminal of the voltage regulator is connected to the comparator circuit, the cathode of the first diode is connected to the input terminal of the voltage regulator, the anode of the first diode is connected to the output terminal of the voltage regulator.

4. The charging circuit as claimed in claim 3, wherein the regulating circuit comprises a transistor, the collector of transistor is connected to the other terminal of the control switch, the base of the transistor is connected to the driving circuit, the emitter of the transistor is connected to the filter circuit.

5. The charging circuit as claimed in claim 4, wherein the filter circuit comprises a third capacitor, an inductor, and a second diode, a terminal of the inductor is connected to the emitter of the transistor, the other terminal of the inductor is configured to connect to a charging terminal of the electronic device, the cathode of the second diode is connected to the emitter of the transistor, the anode of the second diode is connected to the negative terminal of the storage battery, the third capacitor is connected between the two charging terminals of the electronic device.

6. The charging circuit as claimed in claim 5, wherein the collecting circuit comprises a first resistor connected series with a second resistor the resistor and the two resistors are connected between the two charging terminals of the electronic device.

7. The charging circuit as claimed in claim 6, wherein the comparator circuit comprises a first comparator, an inverting terminal of the first comparator is connected to a node of the first and the second resistors, a non-inverting terminal of the first comparator is connected to the output terminal of the voltage regulator, an output of the first comparator is connected to the driving circuit.

8. The charging circuit as claimed in claim 7, wherein the rectangular wave generator comprises a second comparator, a fourth capacitor, a third resistor, a fourth resistor, a fifth resistor, a six resistor, and a voltage regulator diode, an inverting terminal of the second comparator is connected to the other terminal of the control switch via the third resistor and grounded via the fourth capacitor, a non-inverting terminal of the second comparator is grounded via the fourth resistor and connected to the other terminal of the control switch via the six resistor, the voltage regulator diode is connected between the ground and the other terminal of the control switch, an output terminal of the second comparator is connected to the integral circuit via the fifth resistor.

9. The charging circuit as claimed in claim 8, wherein the integral circuit comprises a third comparator, a fifth capacitor, a seventh resistor, and an eighth resistor, an inverting terminal of the third comparator is connected to the fifth resistor via the seventh resistor, a non-inverting terminal of the third comparator is grounded, an output terminal of the third comparator is connected to the driving circuit, the fifth capacitor is connected between the inverting and output terminals of the third comparator.

10. The charging circuit as claimed in claim 9, wherein the driving circuit comprises a fourth comparator, an inverting terminal of the fourth comparator is connected to the output terminal of the third comparator, a non-inverting terminal of the fourth comparator is connected to the output terminal of the first comparator, an output terminal of the fourth comparator is connected to the base of the transistor.

11. A charging circuit for charging an electronic device by a portable device, the charging circuit comprising:
- a storage battery of the portable device for providing power;
- a reference voltage circuit receiving the power of the storage battery to provide a reference voltage;
- a rectangular wave generator receiving the power of the storage battery to provide a rectangular wave signal;
- an integral circuit converting the rectangular wave signal to a triangle wave signal;
- a transistor, the collector of the transistor connected to the storage battery, the emitter of the transistor connected to the electronic device; and
- a first comparator and a second comparator, the first comparator comprising an inverting input terminal connected to the emitter of the transistor, a non-inverting input terminal receiving the reference voltage from the reference voltage circuit, and an output terminal, the second comparator comprising an inverting input terminal connected to the integral circuit to receive the triangle wave signal, a non-inverting input terminal connected to the output terminal of the first comparator, and an output terminal providing a pulse width modulation (PWM) signal to the base of the transistor.

12. The charging circuit as claimed in claim 11, further comprising a switching circuit controlling on or off of the charging circuit, wherein the switching circuit comprises a control switch connected between the positive terminal of the storage battery and the transistor, and a trigger switch connected between the negative terminal of the storage battery and a detecting terminal of the storage battery.

13. The charging circuit as claimed in claim 11, further comprising a filter circuit, wherein the filter circuit comprises an inductor connected between the emitter of the transistor and the electronic device, a diode with the cathode connected to the emitter of the transistor and the anode connected to the negative terminal of the storage battery, and a capacitor connected between the electronic device and the negative terminal of the storage battery.

14. The charging circuit as claimed in claim 11, further comprising a sampling circuit comprising two resistors connected in series between the emitter of the transistor and the negative terminal of the storage device, the inverting terminal of the first comparator connected to a node between the two resistors.

15. The charging circuit as claimed in claim 11, wherein the integral circuit comprises a third comparator comprising an inverting input terminal receiving the rectangular wave signal, a non-inverting input terminal grounded via a resistor, and an output terminal outputting the triangle wave signal, and a capacitor connected between the inverting input terminal and the output terminal of the third comparator.

16. The charging circuit as claimed in claim 11, wherein the rectangular wave generator comprises a fourth comparator comprising an output terminal receiving the power of the storage battery and outputting the rectangular wave signal, an inverting terminal connected to the output terminal of the fourth comparator and grounded via a capacitor, a non-inverting input terminal connected to the output terminal of the fourth comparator, and a voltage regulator diode connected between the output terminal of the fourth comparator and ground.

17. The charging circuit as claimed in claim 11, wherein the reference voltage circuit includes comprises a three-terminal positive voltage regulator, a first diode, a first capacitor and a second capacitor, the first capacitor is connected between the positive terminal and the negative terminal of the storage battery, an input terminal of the voltage regulator is connected to the positive terminal of the storage battery, a ground terminal of the voltage regulator is connected to the negative terminal of the storage battery, an output terminal of the voltage regulator is connected to the comparator circuit, the cathode of the first diode is connected to the input terminal of the voltage regulator, the anode of the first diode is connected to the output terminal of the voltage regulator.

* * * * *